United States Patent
Hohl-AbiChedid et al.

(10) Patent No.: US 7,982,403 B2
(45) Date of Patent: Jul. 19, 2011

(54) MULTIFUNCTIONAL MOTOR VEHICLE HEADLIGHT MODULE, IN PARTICULAR FOR THE FRONT REGION OF A MOTOR VEHICLE

(75) Inventors: Angela Hohl-AbiChedid, Beverly, MA (US); Thomas Reiners, Bachhagel (DE); Ralf Vollmer, Ulm (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 575 days.

(21) Appl. No.: 12/083,495

(22) PCT Filed: Oct. 12, 2006

(86) PCT No.: PCT/EP2006/067331
§ 371 (c)(1),
(2), (4) Date: Apr. 11, 2008

(87) PCT Pub. No.: WO2007/042552
PCT Pub. Date: Apr. 19, 2007

(65) Prior Publication Data
US 2009/0230893 A1    Sep. 17, 2009

(30) Foreign Application Priority Data
Oct. 14, 2005  (DE) .......................... 10 2005 049 685

(51) Int. Cl.
*B60Q 1/02* (2006.01)

(52) U.S. Cl. .......... 315/82; 362/507; 362/538; 362/547; 362/548

(58) Field of Classification Search ............... 315/77, 315/82; 362/459, 475, 470, 487, 507, 538, 362/539, 546, 547, 548, 549
See application file for complete search history.

(56) References Cited

U.S. PATENT DOCUMENTS

| | | |
|---|---|---|
| 6,406,172 B1 * | 6/2002 | Harbers et al. ............... 362/544 |
| 6,527,411 B1 | 3/2003 | Sayers |
| 6,601,982 B1 | 8/2003 | Begemann et al. |
| 7,128,454 B2 * | 10/2006 | Kim et al. ..................... 362/507 |
| 7,201,506 B2 | 4/2007 | Ishida et al. |
| 7,318,662 B2 * | 1/2008 | Takeda et al. ................. 362/475 |
| 2007/0008734 A1 | 1/2007 | Bogner et al. |

FOREIGN PATENT DOCUMENTS

| | | |
|---|---|---|
| CN | 2252139 Y | 4/1997 |
| DE | 103 14 524 A1 | 10/2004 |
| FR | 2 861 833 A | 5/2005 |
| GB | 2 412 724 A | 10/2005 |
| JP | 2002343587 A | 11/2002 |
| WO | 2004/088200 A2 | 10/2004 |

OTHER PUBLICATIONS

Machine translation of CN 2252139 Y.
English translation of Chinese Office Action dated May 8, 2009.
English language abstract for JP 2002343587A.

* cited by examiner

*Primary Examiner* — Thuy Vinh Tran

(57) ABSTRACT

A motor vehicle headlight module having at least two lighting units (1) is specified. Here, each lighting unit (1) comprises at least one light-emitting diode chip (2). Different lighting units (1) are provided here for different lighting functions. Furthermore, the motor vehicle headlight module has a common heat sink (6) for the lighting units, to which heat sink the lighting units are thermally connected, and a common current-stabilizing electronic system (8) for supplying voltage to the lighting units.

19 Claims, 4 Drawing Sheets

MULTIFUNCTIONAL MOTOR VEHICLE HEADLIGHT MODULE, IN PARTICULAR FOR THE FRONT REGION OF A MOTOR VEHICLE

FIELD OF THE INVENTION

The invention is related to a motor vehicle headlight module. The motor vehicle headlight module is suitable in particular for use in a motor vehicle headlight housing in the front region of a motor vehicle.

BACKGROUND

The document U.S. Pat. No. 6,601,982 B2 describes a motor vehicle headlight.

SUMMARY

One object to be achieved consists in specifying a particularly compact and versatile motor vehicle headlight module.

At least one embodiment specifies a motor vehicle headlight module which has at least two luminous units. The different luminous units are in this case provided for light functions which are different than one another. Thus, one of the luminous units can be suitable, for example, for producing an upper beam emission characteristic or an upper beam-like emission characteristic. The light function associated with the luminous unit is then that of an upper beam. Another luminous unit can be suitable for producing a lower beam emission characteristic or a lower beam-like emission characteristic. The light function associated with the luminous unit is then that of a lower beam.

In addition, it is possible for a luminous unit to be provided for a specific, predetermined first light function and for a second light function to result from a further luminous unit of the motor vehicle headlight module being connected. The second light function is then provided by a combination of the emission characteristics of the two luminous units.

In accordance with at least one embodiment, each of the luminous units has at least one light-emitting diode chip as the light or radiation source. Preferably, each luminous unit has a plurality of light-emitting diode chips, which form the light source of the luminous unit.

In accordance with at least one embodiment, the luminous units of the motor vehicle headlight module are thermally connected to a common cooling body. Heat produced during operation of the light sources of the luminous units is absorbed by the cooling body and emitted by it to the surrounding environment.

Preferably, the module in this case comprises a single cooling body for all of the luminous units of the motor vehicle headlight module. In addition to its function as a heat sink, the cooling body is also provided as a common mount for the luminous units. The cooling body is preferably additionally a module mount. This means that further component parts of the motor vehicle headlight module such as optical elements, for example, can be fixed on the cooling body. In comparison with the luminous units of the motor vehicle headlight module, the cooling body preferably has a large extent. As regards volume and weight, the cooling body represents the main component part of the motor vehicle headlight module.

However, the cooling body can also be a heat-conducting element, which is suitable for dissipating the heat produced by the light sources to a further cooling body. The further cooling body is then, for example, a common cooling body for a plurality of motor vehicle headlight modules. The further cooling body can also be formed by the bodywork of a motor vehicle or the housing of a headlight.

In accordance with at least one embodiment, the motor vehicle headlight module also has current-stabilizing electronics, for example a current regulator, for supplying voltage to the luminous units of the motor vehicle headlight module. Preferably, in this case a single current regulator serves the purpose of supplying voltage to all of the luminous units of the module. The current-stabilizing electronics can be fitted, for example, on a mount for the luminous units. It is further possible for the current-stabilizing electronics to be fitted on the cooling body or to be integrated in the cooling body.

In accordance with at least one embodiment of the motor vehicle headlight module, the motor vehicle headlight module comprises at least two luminous units, each of the luminous units comprising at least one light-emitting diode chip. Different luminous units of the motor vehicle headlight module are provided for light functions which are different than one another. The luminous units are in this case fitted on a common cooling body. In addition, the motor vehicle headlight module comprises common current-stabilizing electronics for supplying voltage to the luminous units of the module.

The motor vehicle headlight module is based, inter alia, on the concept that the integration of a plurality of luminous units on a single cooling body, which can at the same time be provided as the module mount of the entire module, makes a particularly compact motor vehicle headlight module possible. Since the different luminous units take care of light functions which are different than one another, this compact motor vehicle headlight module is particularly versatile. In addition, the compact arrangement of the luminous units makes it possible to use a single set of current-stabilizing electronics for all of the luminous units of the module. In addition, this makes a particularly inexpensive motor vehicle headlight module possible since, for example, a single current regulator is sufficient for all of the luminous units of the module. The multifunctional headlight module described is particularly suitable for use instead of conventional two-cal filament lamps in the front region of a motor vehicle.

A motor vehicle headlight can comprise a plurality of such modules for light production. In addition, it is possible for a motor vehicle headlight to have such a motor vehicle headlight module and further elements for light production. In addition to the motor vehicle headlight module described, the headlight can therefore also comprise one or more gas discharge lamps for light production, for example.

In accordance with at least one embodiment of the motor vehicle headlight module, each luminous unit comprises a primary optical unit. The primary optical unit is in each case suitable for forming the electromagnetic radiation produced by the light sources of the luminous units, preferably light-emitting diode chips, during operation in such a way that an emission characteristic corresponding to the light function desired for the luminous unit is set. For this purpose, the primary optical unit is arranged downstream in each case of the light source of a luminous unit. In other words, the light function associated with the luminous unit is primarily determined by the primary optical unit. Preferably, each luminous unit has precisely one primary optical unit.

In accordance with at least one embodiment of the motor vehicle headlight module, the primary optical unit of at least one of the luminous units, at least in places, is in the form of one of the following optical basic elements: compound parabolic concentrator (CPC), compound elliptic concentrator (CEC), compound hyperbolic concentrator (CHC). This means that the primary optical unit has reflective side walls, which are formed, at least in places, in the manner of one of these optical basic elements. Furthermore, the primary optical unit can be formed, at least in places, in the manner of a truncated pyramid optical unit or a truncated cone optical unit.

In all of these cases, the primary optical unit is preferably designed in such a way that it tapers toward the light source of the luminous unit, i.e. toward the light-emitting diode chips, for example. Then, the cross-sectional area of the primary optical unit increases in the direction of a radiation exit face of the primary optical unit. By means of electromagnetic radiation being reflected on the side walls of the primary optical unit, a predeterminable emission characteristic of the luminous unit is produced at the radiation exit face of the primary optical unit or remote from the radiation exit face outside the primary optical unit. Optimization of the side walls of the primary optical unit for the purpose of setting a desired, predeterminable emission characteristic can take place, for example, using ray-tracing simulations.

In all of the configurations described, the primary optical unit can be in the form of a hollow body, in which case the inner faces, which face the light source of the luminous unit, of the side walls are provided with a reflective coating. In addition, it is possible for the primary optical unit to be in the form of a solid body, which is formed from a transparent, dielectric material. In this case, electromagnetic radiation is guided in the primary optical unit at least partially by means of total reflection. For the case of a solid-body optical unit, it is particularly also possible for the radiation exit face of the primary optical unit to be curved in the manner of a lens or to be structured. In this way, when light exits through the radiation exit face, further beam-shaping occurs.

Preferred materials for forming the primary optical unit are, for example, PMMA, PMMI, PC or glass.

In accordance with at least one embodiment of the motor vehicle headlight module, the primary optical unit has a microstructured surface. This means that at least one radiation passage face of the primary optical unit is microstructured in places. The microstructures preferably have a structure size in the range of the wavelength of the electromagnetic radiation produced by the luminous units. Diffraction of the electromagnetic radiation passing through the structured radiation passage face therefore preferably takes place on the microstructures.

For example, the primary optical unit comprises an optical unit body, whose radiation exit face is curved in the manner of an aspherical lens. The radiation entry face can then have microstructures which are suitable, for example, for reducing color anomalies.

In accordance with at least one embodiment of the motor vehicle headlight module, a common secondary optical unit is arranged downstream of the luminous units of the module. This means that the module has a single secondary optical unit, which is suitable for projecting the emission characteristic produced by the luminous units into the far field, i.e. for example onto a road on which the motor vehicle with the motor vehicle headlight module is moving.

In other words, the motor vehicle headlight module described here has a common single exit aperture for all of the luminous units. The motor vehicle headlight module described in this case makes use of the concept, inter alia, that the use of a single exit aperture for all of the luminous units of the headlight module makes a particularly compact module possible.

The secondary optical unit can be mechanically connected to the cooling body, for example, and fixed on it. Since the luminous units are also fixed at least indirectly on the cooling body, particularly precise adjustment of the luminous unit and the downstream secondary optical unit is thus made possible. The luminous units and the secondary optical unit of the motor vehicle headlight module in this case only need to be adjusted relative to the cooling body. This can take place, for example, by means of locating pins and corresponding locating holes. Once they have been fitted on the cooling body, the elements of the motor vehicle headlight module are then already located in the desired position relative to one another.

In accordance with at least one embodiment of the motor vehicle headlight module described here, the secondary optical unit comprises a reflective optical element. For example, the secondary optical unit is a reflector optical unit. In the case of a reflector optical unit, the luminous units of the module can be optically decoupled from one another in such a way that they emit radiation at different solid angles detected by the reflector optical unit. This is possible, for example, by means of a mirror or another reflective apparatus which is fitted between in each case two luminous units of the module. The optical decoupling can, however, also be achieved by means of a, for example, totally reflecting primary optical unit.

The reflector optical unit can be configured in such a way that a first radiation bundle for example of a first luminous unit is used as the lower beam. A further radiation bundle of a second luminous unit emits radiation, for example, through the position, which is offset toward the focal point of the reflector optical unit, into the upper hemisphere and acts as the upper beam.

In accordance with at least one embodiment of the motor vehicle headlight module, the secondary optical unit comprises a projection optical unit. For example, the secondary optical unit is then given by a projection lens. The projection lens is arranged downstream of the luminous units in the main emission direction of the luminous units. In this case, the primary optical unital units of the motor vehicle headlight module are preferably fitted in the module in such a way that their radiation exit faces converge flush. The emission characteristic produced on or in the main emission direction after the radiation exit faces is then imaged by the projection lens into the far field. If the motor vehicle headlight module comprises, for example, two luminous units, a separating line in the center between the two radiation exit faces of the luminous units intersects the optical axis of the projection lens preferably at a right angle. In this way, the projection of the emission characteristic of one luminous unit in the far field can come to lie below the horizon and the projection of the emission characteristic of the other luminous unit in the far field can come to lie above the horizon. In this way, for example, a lower beam and an upper beam are realized by a single motor vehicle headlight module with a single projection lens. Preferably, a common projection lens is used for the lower beam and the upper beam. This means that a single exit aperture is used for two light functions.

In accordance with at least one embodiment of the motor vehicle headlight module, the light-emitting diode chips of the luminous units are fitted on a common mount. In this case, it is possible for all of the luminous units to each have a separate, dedicated mount or for all of the luminous units of the module to be combined on a single common mount. The mount(s) is/are preferably formed by printed circuit boards, which comprise conductor tracks and contact points for making electrical contact with the light-emitting diode chips. In this case it is possible for the light-emitting diode chips to be driven separately from one another. However, it is also possible for a plurality of light-emitting diode chips to be connected in series with one another and to only be able to produce electromagnetic radiation at the same time. In addition, the mounts can comprise, for example, apparatuses for protecting the light-emitting diode chips from electrostatic voltage pulses (electrostatic discharge ESD). In addition, it is possible for the current-stabilizing electronics of the motor vehicle headlight module to be located on one of the mounts for the luminous units.

The mount is, for example, a ceramic, which has particularly good thermal conductivity. The mount can be fitted on a metal core plate or directly on the cooling body. The metal core plate preferably contains a material which has particularly good thermal conductivity such as aluminum or copper, for example. The metal core plate is then preferably fitted on the cooling body in such a way that heat can be emitted over a large area to the cooling body via the underside, which is remote from the light-emitting diode chips, of the mount.

In accordance with at least one embodiment of the motor vehicle headlight module, the luminous units of the module are connected in series with one another. Furthermore, each luminous unit of the module is then connected in parallel with a switching unit. When the switching unit is closed, the luminous unit, which is connected in parallel with the switching unit, is bridged, with the result that at least a large proportion of the current does not flow through the branch in which the luminous unit is located. In this way, the luminous unit is not energized when the switch is closed. The luminous units which are connected in series are connected to common current-stabilizing electronics, for example a current regulator, for voltage supply. The switching device can comprise, for example, a switching transistor.

In accordance with at least one embodiment of the motor vehicle headlight module, at least one luminous unit is provided for a lower beam light function. This means that the emission characteristic produced by this luminous unit is a lower beam-like emission characteristic. In this context, a lower beam-like emission characteristic is understood to mean, for example, an emission characteristic which falls under the specifications of UNECE Regulations 98, 112 and/or §571.108 FMVSS for lower beams.

In accordance with at least one embodiment of the motor vehicle headlight module, at least one luminous unit is provided for an upper beam light function. This means that the emission characteristic produced by this luminous unit is an upper beam-like emission characteristic. In this context, an upper beam-like emission characteristic is understood to mean, for example, an emission characteristic which falls under the specifications of UNECE Regulations 98, 112 and/or §571.108 FMVSS for upper beams.

In accordance with at least one embodiment of the motor vehicle headlight module, at least one luminous unit is provided for a cornering beam light function. This means that the emission characteristic produced by this luminous unit has a cornering beam-like emission characteristic. In this context, a cornering beam-like emission characteristic is understood to mean, for example, an emission characteristic which falls under the specifications of UNECE Regulations 98, 112 and/or §571.108 FMVSS for cornering beams.

In accordance with at least one embodiment of the motor vehicle headlight module, at least one luminous unit is provided for a position light function. This means that the emission characteristic produced by this luminous unit has a position light-like emission characteristic. In this context, a position light-like emission characteristic is understood to mean, for example, an emission characteristic which falls under the specifications of UNECE Regulation 7 for position lights.

In accordance with at least one embodiment, the motor vehicle headlight module has at least two luminous units, each luminous unit being provided for a respective other one of the light functions described. The motor vehicle headlight module can in this case comprise luminous units for all of the light functions described here. Furthermore, it is possible for specific light functions to result from the combination of the emission characteristic of a plurality of, for example two, luminous units.

In accordance with at least one embodiment of the motor vehicle headlight module, at least one of the luminous units comprises at least one light-emitting diode chip which is suitable for producing electromagnetic radiation with an emission maximum in the near infrared range. In this case, the reddish color impression of the electromagnetic radiation produced by the infrared light-emitting diode chip is outshone by the white light of the other light-emitting diode chips of the luminous unit or by the white light of the other luminous unit. The red light content can in this case also be used to increase the color rendering value of the white light, which is produced for example by means of mixing blue and yellow light, of the luminous units.

The infrared content of the electromagnetic radiation produced by the infrared light-emitting diode chip is used for illuminating the area in front of the motor vehicle and can be made visible to the driver of the motor vehicle together with a night vision apparatus. For this purpose, for example, a detector chip, which has particularly high sensitivity in the infrared range, is located in the motor vehicle headlight module. The detector is fitted, for example, on the mount of a luminous unit or the cooling body. However, it is also possible for the detector to be located outside the motor vehicle headlight module at another point in the front region of the motor vehicle.

BRIEF DESCRIPTION OF THE DRAWINGS

The motor vehicle headlight module described here will be described in more detail below with reference to exemplary embodiments and the associated figures. Identical or functionally identical component parts of the figures are in this case provided with the same reference symbols. The component parts illustrated and the size ratios of the component parts in relation to one another should not be considered as being true to scale. Instead, some details of the figures have been illustrated on an excessively large scale for better understanding.

DETAILED DESCRIPTION

Figure 1A:
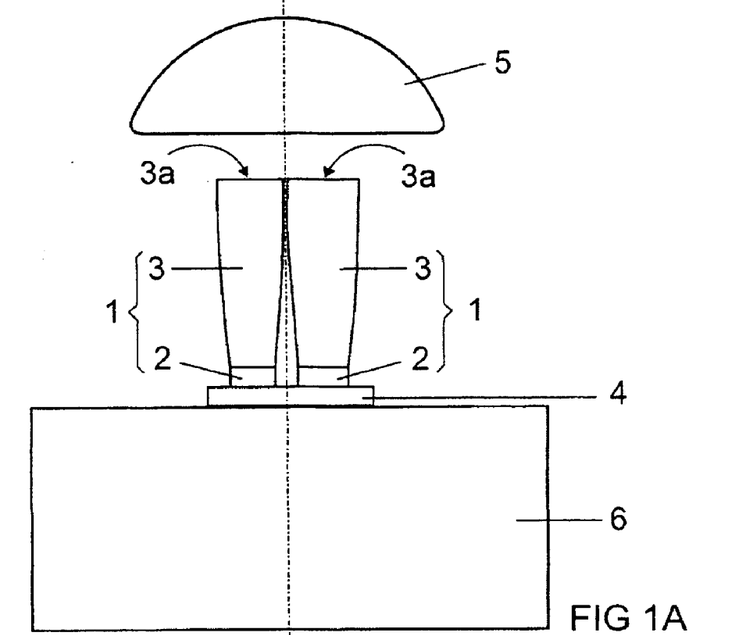
FIG. 1A shows a schematic sectional illustration of the motor vehicle headlight module described here in accordance with a first exemplary embodiment.
Figure 1B:
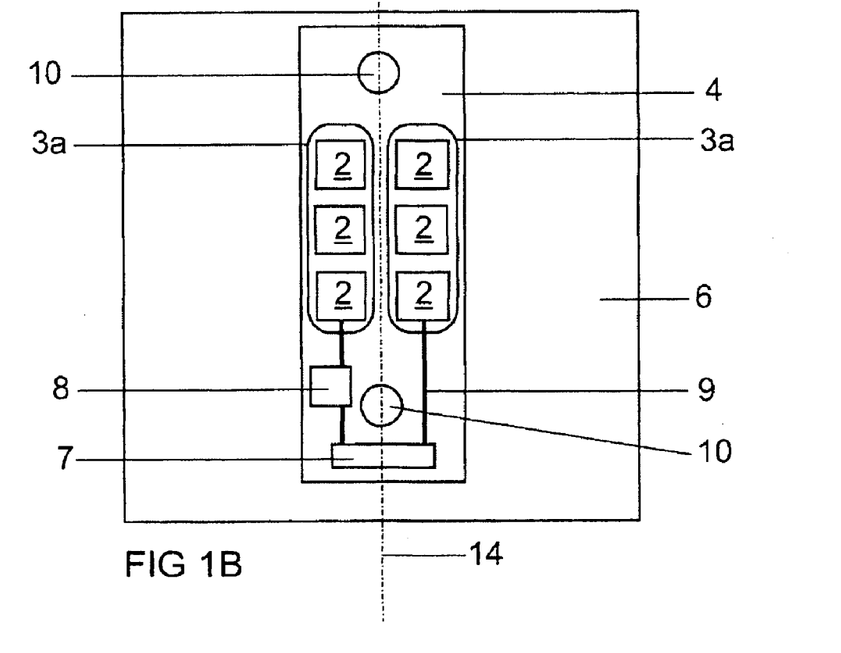
FIG. 1B shows a schematic plan view of a motor vehicle headlight module in accordance with the first exemplary embodiment.

FIG. 1A shows a schematic, sectional illustration of the motor vehicle headlight module in accordance with a first exemplary embodiment. FIG. 1B shows the associated plan view of the motor vehicle headlight module.

The motor vehicle headlight module shown here has two luminous units 1. One of the luminous units is suitable, for example, for producing a lower beam-like emission characteristic. The other luminous unit 1 is then suitable for producing an upper beam-like emission characteristic.

The luminous units 1 each comprise light-emitting diode chips 2 and a primary optical unit 3. The light-emitting diode chips 2 of the two luminous units 1 are fitted on a common mount 4. The light-emitting diode chips 2 are preferably light-emitting diode chips with a so-called thin-film construction.

This means that at least one light-emitting diode chip 2 has a light output face, by means of which a large proportion of the electromagnetic radiation emitted by the light-emitting diode chip 2 is output. Particularly preferably, all of the radiation emitted by the light-emitting diode chip 2 exits through the light output face. The light output face is provided, for example, by part of the surface of the light-emitting diode chip 2. Preferably, the light output face is provided by a main face of the light-emitting diode chip 2 which is arranged, for example, parallel to an epitaxial layer sequence of the light-emitting diode chip 2 which is suitable for producing electromagnetic radiation. This means that the electromagnetic radiation produced in the light-emitting diode chips exits predominantly or exclusively through the upper side, which is remote from the mount 4, of the light-emitting diode chip 2.

For this purpose, the epitaxial layer sequence can have, for example, a pn junction, a double heterostructure, a single quantum well structure or a multiple quantum well structure (MQW). The term quantum well structure can include any structure in which charge carriers experience quantization of their energy states as a result of confinement. In particular, the term quantum well structure does not include any indication of the dimensionality of the quantization. It therefore includes, inter alia, quantum wells, quantum wires and quantum dots and any combination of these structures.

Preferably, the light-emitting diode chip 2 is a light-emitting diode chip in which the epitaxial growth substrate is at least partially removed and on whose surface, which is remote from the original epitaxial growth substrate, a carrier element is fitted.

The carrier element can be selected relatively freely, in comparison with an epitaxial growth substrate. Preferably, a carrier element is selected which, in terms of its coefficient of thermal expansion, is adapted particularly easily to the radiation-producing epitaxial layer sequence. Furthermore, the carrier element can contain a material which has particularly high thermal conductivity. In this way, the heat produced during operation of the light-emitting diode chip 2 is dissipated particularly efficiently to the mount 4.

Those light-emitting diode chips 2 which are produced by the epitaxial growth substrate being removed are often referred to as thin-film light-emitting diode chips and are preferably characterized by at least one of the following features:

A reflective layer or layer sequence is applied or formed on a first main face of the radiation-producing epitaxial layer sequence which points toward the carrier element, which reflective layer or layer sequence reflects at least some of the electromagnetic radiation produced in the epitaxial layer sequence back into said epitaxial layer sequence.

The epitaxial layer sequence preferably has a thickness of a maximum of 20 μm, particularly preferably of a maximum of 10 μm.

Furthermore, the epitaxial layer sequence preferably contains at least one semiconductor layer with at least one face, which has a blending structure. In the ideal case, this blending structure results in an approximately ergodic distribution of the light in the epitaxial layer sequence, i.e. it has a stochastic scattering response which is as ergodic as possible.

One basic principle of a thin-film light-emitting diode chip is described, for example, in the document by I. Schnitzer et al., Appl. Phys. Lett. 63(16), 18 October, 1993, pages 2174 to 2176, whose disclosure content, in relation to the basic principle of a thin-film light-emitting diode chip, is hereby incorporated by reference.

The light-emitting diode chips 2 of the luminous unit 1 are preferably based on a phosphide or nitride compound semiconductor.

"Based on nitride compound semiconductors" in this context means that the active epitaxial layer sequence or at least one layer thereof comprises a nitride III compound semiconductor material, preferably $Al_nGa_mIn_{1-n-m}N$, where $0 \leq n \leq 1$, $0 \leq m \leq 1$ and $n+m \leq 1$. In this case, this material does not necessarily need to have a mathematically precise composition in accordance with the above formula. Instead, it can have one or more dopants and additional constituents which do not change the characteristic physical properties of the $Al_nGa_mIn_{1-n-m}N$ material substantially. For reasons of simplicity, however, the above formula only includes the essential constituents of the crystal lattice (Al, Ga, In, N), even if these can be replaced in part by small quantities of other substances.

"Based on phosphide compound semiconductors" in this context means that the active epitaxial layer sequence or at least one layer thereof preferably comprises $Al_nGa_mIn_{1-n-m}P$, where $0 \leq n \leq 1$, $0 \leq m \leq 1$ and $n+m \leq 1$. In this case, this material does not necessarily need to have a mathematically precise composition in accordance with the above formula. Instead, it can have one or more dopants and additional constituents which do not change the physical properties of the material substantially. For reasons of simplicity, however, the above formula only includes the essential constituents of the crystal lattice (Al, Ga, In, P), even if these can be replaced in part by small quantities of other substances.

These materials are characterized by high internal quantum efficiencies which can be achieved more easily and are suitable for radiation from the ultraviolet (in particular nitride-based compound semiconductor material) and the visible (in particular phosphide-based compound semiconductor materials) spectral range.

For example, the light-emitting diode chips 2 are suitable for producing electromagnetic radiation in the blue spectral range which is partially converted into electromagnetic radiation in the yellow spectral range by means of a wavelength conversion material. In this way, white mixed light is produced.

Particularly preferably, the wavelength conversion material comprises doped garnets such as Ce- or Tb-activated garnets such as YAG:Ce, TAG:Ce, TbYAG:Ce. Examples of suitable wavelength conversion materials are specified in documents WO 97/50132 A1, WO 98/12757 A1 and WO 01/08452 A1, whose disclosure contents in this regard are hereby incorporated expressly by reference.

Furthermore, at least one of the light-emitting diode chips of at least one of the luminous units 1 can be suitable for producing electromagnetic radiation in the near infrared spectral range. This light-emitting diode chip 2 is then preferably based on an arsenide compound semiconductor material.

"Based on an arsenide compound semiconductor material" in this context means that the active epitaxial layer sequence or at least one layer thereof preferably comprises $Al_nGa_mIn_{1-n-m}As$, where $0 \leq n \leq 1$, $0 \leq m \leq 1$ and $n+m-1$. In this case, this material does not necessarily need to have a mathematically precise composition in accordance with the above formula. Instead, it can have one or more dopants and additional constituents which do not change the physical properties of the material substantially. For reasons of simplicity, however, the above formula only includes the essential constituents of the crystal lattice (Al, Ga, In, As), even if these can be replaced in part by small quantities of other substances.

The mount 4 in addition comprises a contact point 7, via which electrical contact can be made with the light-emitting diode chips 2 of the luminous units 1. In addition, switching signals can be passed from outside the motor vehicle headlight module to the luminous units 1 via the contact point 7.

Contact is made with the light-emitting diode chips 2 by means of conductor tracks 9. Current-stabilizing electronics 8 can also be arranged on the mount 4, for example. Such current-stabilizing electronics 8 for supplying voltage to the light-emitting diode chips 2 can also be arranged outside the mount 4, for example on the cooling body 6, however.

In each case one primary optical unit 3 is arranged downstream of the light-emitting diode chips 2 of the luminous units 1 per luminous unit. The radiation exit faces 3a of the primary optical unit units 3 of the two luminous units 1 can converge flush. The primary optical units 3 are, for example, at least in places, reflective optical elements in the form of CPCs, CECs, CHCs, truncated pyramid optical units or truncated cone optical units, as are described further above. Preferably, the primary optical units 3 are suitable for producing a specific emission characteristic on the radiation exit face 3a or at a distance from the radiation exit faces 3a. The projection lens 5 then projects the emission characteristic produced in such a way of the luminous units 1 into the far field.

The mount 4 is fitted on a cooling body 6, for example, by means of locating pins or screws 10. The heat produced during operation by the light-emitting diode chips 2 is emitted to the cooling body 6 through the mount 4, which for this purpose contains, for example, a highly thermally conductive material such as copper or aluminum.

Figure 2:
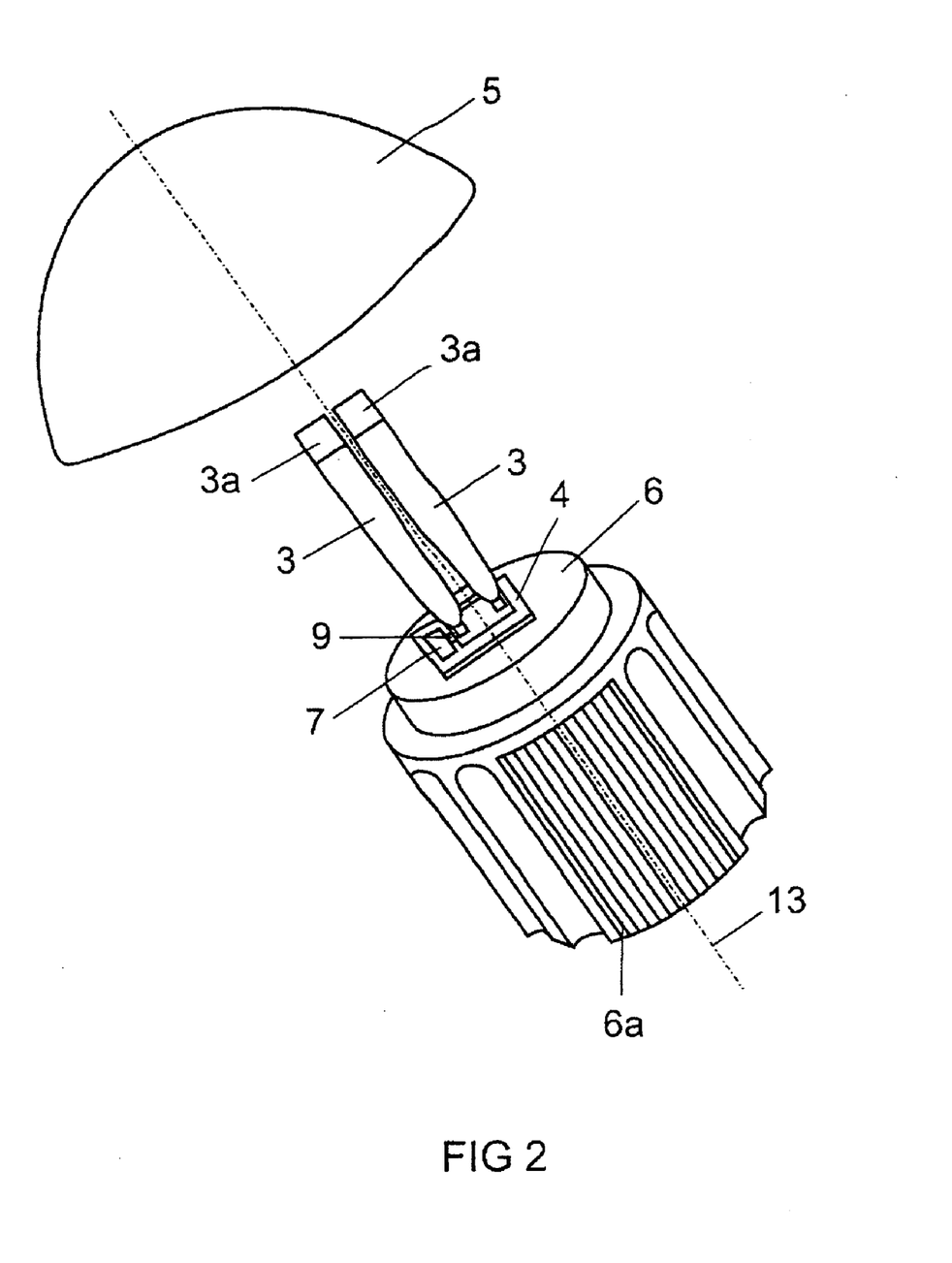
FIG. 2 shows a schematic perspective illustration of a motor vehicle headlight module in accordance with a second exemplary embodiment.

FIG. 2 shows a schematic perspective illustration of a second exemplary embodiment of the motor vehicle headlight module described here. As can be seen in FIG. 2, the separating axis 14 (see in this regard FIGS. 1A, 1B) runs between the radiation exit faces 3a of the two luminous units 1 at right angles with respect to the optical axis 13 of the projection lens 5. In this way, given a corresponding orientation of the motor vehicle headlight module in a motor vehicle front headlight, the imaging of the emission characteristic of the first luminous unit 1 comes to lie below the horizon and the emission characteristic of the second luminous unit 1 comes to lie above the horizon. In this way, a lower beam-like emission characteristic and an upper beam-like emission characteristic can be projected into the far field using only one motor vehicle headlight module. Both luminous units 1 in this case make use of the same exit aperture of the projection lens 5.

In the exemplary embodiment in FIG. 2, the cooling body 6 is in the form of a cylinder. This shape is particularly suitable for simple installation of the module into the front headlight housing of a motor vehicle. For the improved emission of the heat produced by the light-emitting diode chips 2 during operation to the surrounding environment, the cooling body 6 additionally has cooling ribs 6a in the exemplary embodiment in FIG. 2.

Figure 3:
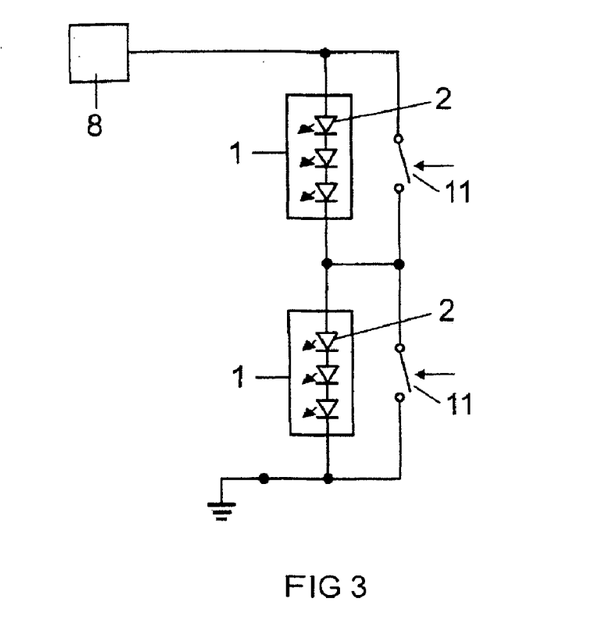
FIG. 3 shows, schematically, exemplary circuitry for the luminous units in accordance with a third exemplary embodiment of the motor vehicle headlight module described here.

FIG. 3 shows for possible circuitry for the luminous units 1 for a further exemplary embodiment of the motor vehicle headlight module described here. This circuitry can be used in all of the exemplary embodiments of the motor vehicle headlight module described here. The supply of voltage to the luminous units 1 takes place via common current-stabilizing electronics 8, for example a current regulator. The luminous units 1 are connected in series with one another. A switching transistor 11 is connected in parallel with each luminous unit 1. When the switching transistor 11 is closed, the luminous unit, which is connected in parallel with the switching transistor 11, is short-circuited, with the result that it is inactive. In this case, a resistor for current reduction can optionally also be arranged in the parallel branch, i.e. in the branch of the switching transistor 11. The described circuitry for the luminous units 1 advantageously makes it possible to provide the luminous units 1 with only one current regulator, with the result that it is not necessary for each luminous unit to be driven by a separate current regulator. In this way, a particularly inexpensive motor vehicle headlight module is made possible.

Figure 4:
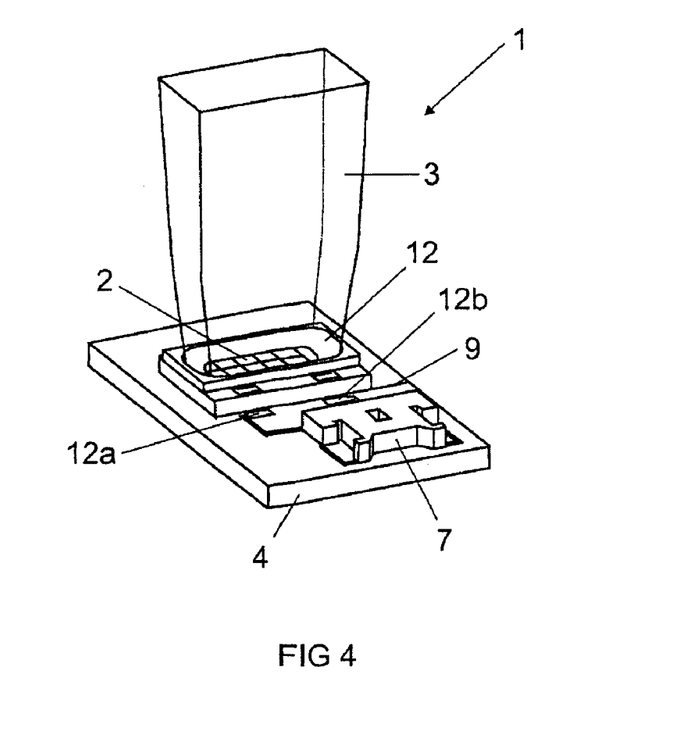
FIG. 4 shows a schematic, perspective illustration of a luminous unit for a fourth exemplary embodiment of the motor vehicle headlight module described here.

FIG. 4 shows a schematic, perspective illustration of a luminous unit 1, as can be used, for example, in a fourth exemplary embodiment of the motor vehicle headlight module described here. In this exemplary embodiment, each luminous unit 1 is arranged on a separate mount 4. The luminous unit 1 shown in FIG. 4 on the mount 4 comprises, for example, five light-emitting diode chips 2. The light-emitting diode chips 2 are preferably thin-film light-emitting diode chips as described above with a luminous efficiency of in each case at least 20 μm/W. Preferably, the light-emitting diode chips 2 are suitable for producing light in the blue spectral range. For this purpose, the light-emitting diode chips 2 are preferably based on a nitride compound semiconductor material. A wavelength conversion material is arranged downstream of the light-emitting diode chips 2. The wavelength-converted content of the electromagnetic radiation emitted by the light-emitting diode chips 2 is mixed with the unconverted content preferably to give white light.

The light-emitting diode chips 2 are arranged on a mount, for example on the base of a housing 12. The housing 12 can be made of a ceramic material such as aluminum nitride for this purpose. Preferably, the housing 12 has inner walls, which are designed to be reflective, at least in places.

Electrical contact can be made with the light-emitting diode chips 2 outside the housing 12 on the contact pads 12a and 12b. Conductor tracks 9 connect the contact pads 12a, 12b to the contact point 7, via which contact can be made with the luminous unit 1 from the outside. For example, the luminous unit 1 can thereby be connected to the electrical supply system of the motor vehicle. The motor vehicle headlight module can have a plurality of such luminous units 1 with in each case one mount 4. In this case, each luminous unit 1 is then provided for a different light function than the other luminous units.

Figure 5:
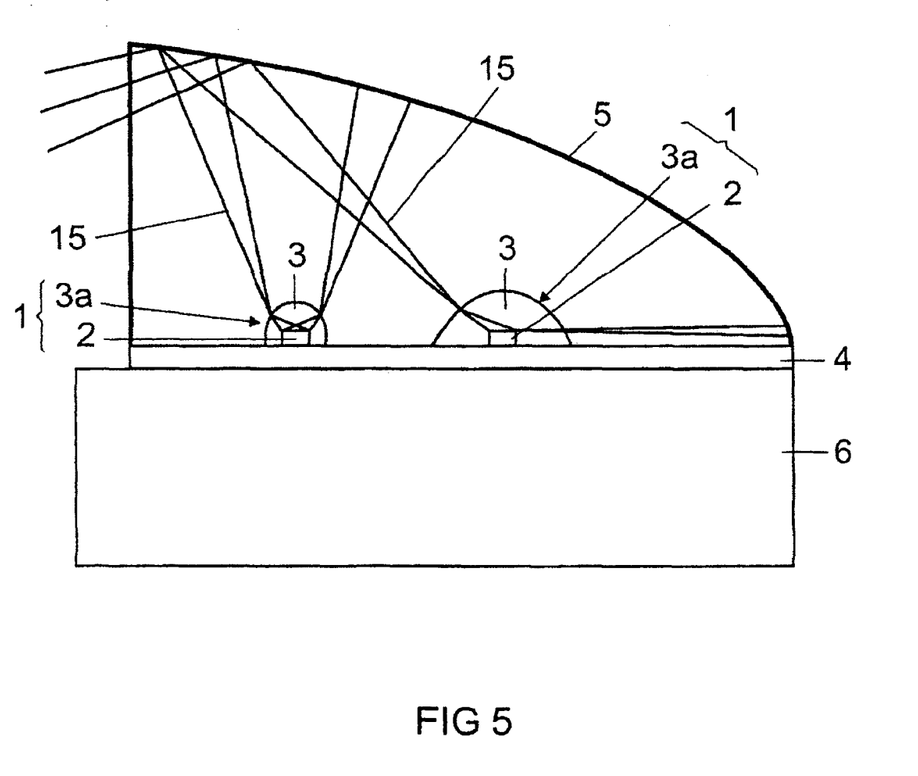
FIG. 5 shows a schematic, sectional illustration of the motor vehicle headlight module described here in accordance with a fifth exemplary embodiment.

FIG. 5 shows a schematic, sectional illustration of the motor vehicle headlight module described here in accordance with a fifth exemplary embodiment.

In accordance with the fifth exemplary embodiment, the secondary optical unit 5 comprises a reflector optical unit. In this exemplary embodiment, the luminous units 1 are optically decoupled from one another. The secondary optical unit 5 is in this case in the form of a hollow body, for example, which is designed to be reflective on its surface facing the light-emitting diode chips 2. For example, the surface is provided with a reflective coating.

The light-emitting diode chips 2 can be arranged on a common mount 4. Beam-shaping of the electromagnetic radiation 15 produced by the light-emitting diode chips 2 takes place firstly by means of primary optical unital units 3. Secondly, beam-shaping takes place by means of the reflective surface of the reflector. The surface of the reflector can be shaped for this purpose for example in the manner of one of the non-imaging optical concentrators described further above.

The luminous unit 1, which is arranged on the left-hand side in FIG. 5, is suitable, for example, for producing upper beam distribution.

The angular range in which radiation is emitted into the reflector is restricted to a specific, predetermined angular range by the primary optical unit 3 of the luminous unit 1 arranged on the left-hand side. The luminous unit 1 arranged on the right-hand side in FIG. 5 is suitable, for example, for producing a lower beam distribution which is broader than the upper beam distribution. The primary optical unit 3 of the luminous unit 1 arranged on the right-hand side is designed, for example, for this purpose in such a way that emission takes place into the entire reflector. The primary optical unital units 3 of the exemplary embodiment shown in FIG. 5 may be, for example, a casting material which envelopes the light-emitting diode chips 2 in a form-fitting manner.

The two luminous units 1 differ from one another by the angular range in which they emit light. This means that the luminous units 1 emit light into the reflector in different angular ranges. This makes it possible to realize at least two different light functions in a single reflector.

The invention is not restricted by the description with reference to the exemplary embodiments. Instead, the invention includes any new feature and any combination of features, which in particular includes any combination of features in the patent claims, even if this feature or this combination of features itself has not been explicitly mentioned in the patent claims or exemplary embodiments.

LIST OF REFERENCE SYMBOLS

1 Luminous unit
2 Light-emitting diode chip
3 Primary optical unit
3a Radiation exit face
4 Mount
5 Secondary optical unit
6 Cooling body
7 Contact point
8 Current-stabilizing electronics
9 Conductor track
10 Locating pin
11 Switching unit
12 Housing
13 Optical axis
14 Separating axis
15 Electromagnetic radiation

The invention claimed is:

1. A motor vehicle headlight module, with at least two luminous units (1), each luminous unit (1) comprising at least one light-emitting diode chip (2) and the at least two different luminous units (1) having light functions which are different from one another, a common cooling body (6) for the at least two luminous units (1), to which the at least two luminous units (1) are thermally connected, and a common current-stabilizing electronics system (8) for supplying voltage to the at least two luminous units (1).

2. The motor vehicle headlight module as claimed in claim 1, in which each luminous unit (1) comprises a primary optical unit (3).

3. The motor vehicle headlight module as claimed in claim 2, in which the primary optical unit (3), at least in places, is in the form of one of the following optical basic elements: CPC optical unit, CEC optical unit, CHC optical unit, truncated pyramid optical unit, truncated cone optical unit.

4. The motor vehicle headlight module as claimed in claim 3, in which the primary optical unit (3) has a microstructured surface.

5. The motor vehicle headlight module as claimed in claim 3, in which a common secondary optical unit (5) is arranged downstream of all of the at least two luminous units (1) of the motor vehicle headlight module.

6. The motor vehicle headlight module as claimed in claim 2, in which the primary optical unit (3) has a microstructured surface.

7. The motor vehicle headlight module as claimed in claim 2, in which a common secondary optical unit (5) is arranged downstream of all of the at least two luminous units (1) of the motor vehicle headlight module.

8. The motor vehicle headlight module as claimed in claim 2, in which the light-emitting diode chips (2) of the at least two luminous units (1) are arranged on a common printed circuit board (4).

9. The motor vehicle headlight module as claimed in claim 2, in which the at least two luminous units (1) are connected in series with one another, and each luminous unit (1) is connected in parallel with in each case one switching unit (11) in such a way that, when the switching unit (11) is closed, the luminous unit (1) is not energized.

10. The motor vehicle headlight module as claimed in claim 2, in which at least one of the at least two luminous units (1) is provided for one of the following light functions: lower beam, upper beam, cornering beam, position light.

11. The motor vehicle headlight module as claimed in claim 2, wherein the light-emitting diode chip (2) which is suitable for producing electromagnetic radiation with an emission maximum in an infrared spectral range.

12. The motor vehicle headlight module as claimed in claim 1, in which a common secondary optical unit (5) is arranged downstream of all of the at least two luminous units (1) of the motor vehicle headlight module.

13. The motor vehicle headlight module as claimed in claim 12, in which the secondary optical unit (5) comprises a reflective optical element.

14. The motor vehicle headlight module as claimed in claim 12, in which the secondary optical unit (5) comprises a projection optical unit.

15. The motor vehicle headlight module as claimed in claim 1, in which the light-emitting diode chips (2) of the at least two luminous units (1) are arranged on a common printed circuit board (4).

16. The motor vehicle headlight module as claimed in claim 1, in which the at least two luminous units (1) are connected in series with one another, and each luminous unit (1) is connected in parallel with in each case one switching unit (11) in such a way that, when the switching unit (11) is closed, the luminous unit (1) is not energized.

17. The motor vehicle headlight module as claimed in claim 16, in which the switching unit (11) comprises a switching transistor.

18. The motor vehicle headlight module as claimed in claim 1, in which at least one of the at least two luminous units (1) is provided for one of the following light functions: lower beam, upper beam, cornering beam, position light.

19. The motor vehicle headlight module as claimed in claim 1, wherein the light-emitting diode chip (2) is suitable for producing electromagnetic radiation with an emission maximum in an infrared spectral range.

* * * * *